United States Patent [19]

Boin et al.

[11] Patent Number: 4,893,760
[45] Date of Patent: Jan. 16, 1990

[54] MIXING ARM FOR A DOMESTIC FOOD PROCESSOR

[76] Inventors: Bernard Boin; Alain P. C. Bouverie, both of Sté Moulinex-Z.I., Route de St-Jean-des Baisants, 5000 St. Lo, France

[21] Appl. No.: 286,883

[22] Filed: Dec. 20, 1988

[30] Foreign Application Priority Data

Dec. 31, 1987 [FR] France .................. 87 18474

[51] Int. Cl.⁴ .................................. B02C 18/22
[52] U.S. Cl. ........................ 241/282.2; 241/46 R; 366/343
[58] Field of Search .............. 366/342, 343, 279, 196, 366/129, 130; 241/101 B, 2, 282.1, 46 R, 282.2, 46 B, 46.17

[56] References Cited

FOREIGN PATENT DOCUMENTS 78234  5/1962  France ......................... 241/282.2

Primary Examiner—Mark Rosenbaum
Attorney, Agent, or Firm—Young & Thompson

[57] ABSTRACT

A mixing arm for a domestic food processor is provided with a bell in which is fitted a mixing tool driven at high speed by a rotating shaft adapted to be coupled to a drive unit. The bell has a partition extending downwards transversely to the top wall and thus dividing the space beneath the bell into a suction zone and a compression zone, the upper region of the partition having a transfer opening connecting the two zones.

9 Claims, 1 Drawing Sheet

MIXING ARM FOR A DOMESTIC FOOD PROCESSOR

BACKGROUND OF THE INVENTION

The invention relates to mixing arms intended especially for chopping foodstuffs immersed in a liquid More specifically, it relates to mixing arms comprising a tubular guard the upper part of which fits on a drive unit and the lower part of which comprises a bell. A rotatable shaft, disposed longitudinally in the said guard, passes through the top of the bell and the upper end of the shaft is coupled to a rotating drive driven at high speed by a drive unit whereas its lower end rotates integrally with a mixing tool disposed transversely to the said shaft.

It is known that mixing arms of this kind are principally used for the preparation of vegetable soups and that they require a sufficiently long operating time to obtain complete homogenization of the soup.

SUMMARY

The object of the invention is to improve mixing arms of this kind.

According to the invention, the bell of the mixing arm comprises a partition extending downwards transversely to the top wall. This divides the space beneath the bell into two zones, one termed a suction zone in which the mixing tool is fitted, and one termed a compression zone situated between the external face of the partition and the corresponding wall of the bell. The upper region of the partition has an oblong transfer opening extending in its width and thus making a passage between the said suction zone and the said compression zone.

Such a mixing arm is particularly effective, since, thanks to this partition and its transfer opening, a particularly vigorous flow is created in the bell between the two zones. This favours either perfect homogenization of soups or, surprisingly, preparation of emulsions such as mayonnaises.

DESCRIPTION OF THE PREFERRED EMBODIMENTS

Figure 1:
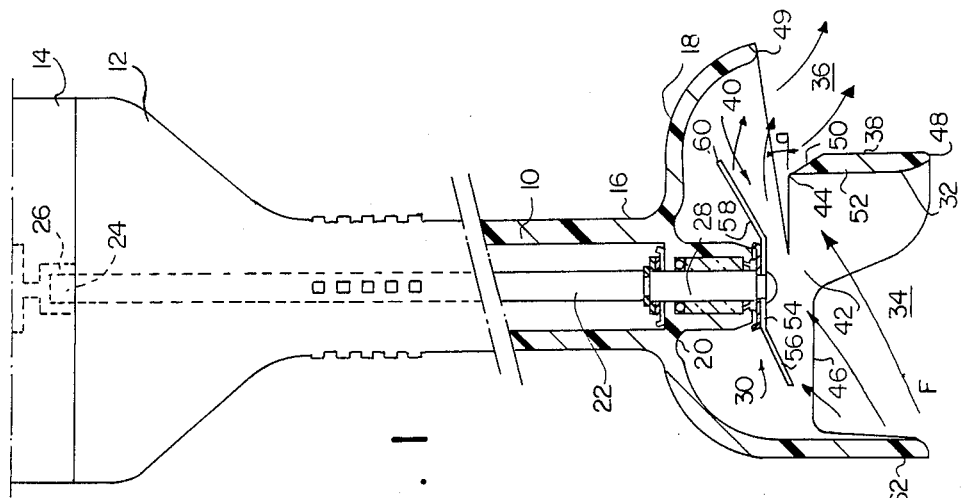
FIG. 1 shows, partly in elevation and partly in cross-section, a mixing arm according to the invention.

The mixing arm shown in FIG. 1 comprises a tubular guard 10 the upper part 12 of which is adapted to be mounted, for example, in a hand-held mixer comprising a drive unit 14, and the lower part 16 of which comprises a bell 18 of generally hemispherical shape, mounted eccentrically relative to the guard 10. A rotatable shaft 22, disposed longitudinally in the guard 10, passes through the flattened top 20 of the bell, the upper end 24 of the shaft 22 being adapted to be coupled to a rotating drive 26 driven at high speed by the drive unit 14, whereas its lower end 28 carries a mixing tool 30 disposed transversely to the shaft 22 for rotation therewith.

In accordance with the invention the bell 18 comprises a partition 32 extending downwards transversely to its top wall 20 and thus dividing the space beneath the bell into two zones, one termed a suction zone 34 in which the mixing tool 30 is fitted, and one termed a compression zone 36 situated between the external face 38 of the partition 32 and the corresponding wall of the bell 18. The upper region of this partition 32 having an oblong transfer opening 40 extending in its width, transversely to the tool 30, and thus connecting the suction zone 34 to the compression zone 36.

Figure 2:
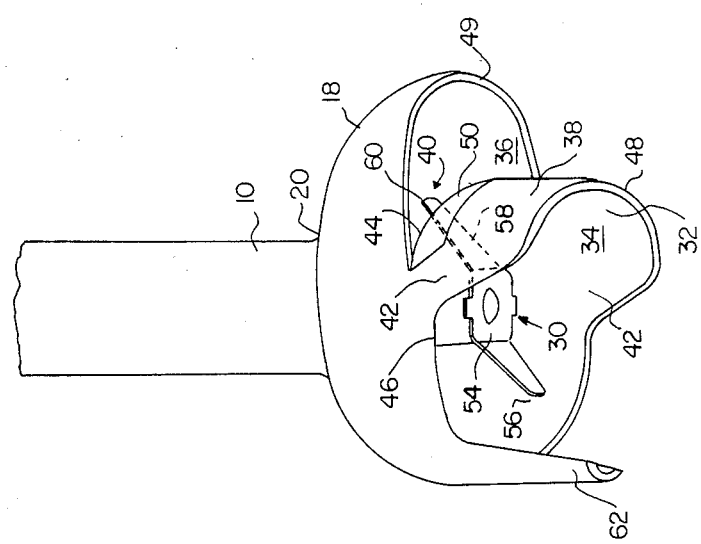
FIG. 2 is a partial view of the mixing arm with the bell shown in perspective view.

As can be seen more clearly in FIG. 2, this partition 32 has a generally rectangular shape and extends with an incurved surface outside the bell 18. The lateral ends 42 of this partition 32 are attached at two diametrically opposite regions of the descending wall of the bell 18, in such a way that the upper edge 44 of this partition is attached by its lateral ends 42 substantially level with the peripheral edge 46 of the descending wall, but with a slight offset in height towards the interior of the bell relative to the edge 46, and the lower edge 48 of the partition is at a distance from the peripheral edge 46 of the descending wall. The transfer opening 40 is thus made between the top 20 of the bell and the upper edge 44 of the partition 32 in this embodiment. In an alternative embodiment (not shown) the upper edge of the partition is connected to the top of the bell and the partition is formed with an oblong opening to provide the transfer opening.

It will be noted that in the compression zone 36 of the bell the peripheral edge 46 has the shape of an arch 49 extending in a plane which forms an acute angle a, of about ten degrees, with the upper edge 44 of the partition 32, and the upper edge 44 of the partition 32 has an external bevel 50 extending from the internal face 52 to the external face 38.

So that the mixing arm operates perfectly with foodstuffs such as carrots and potatoes, the mixing tool 30 comprises a hub 54 disposed orthogonally to the shaft 22 and bearing two diametrically opposed asymmetric cutters 56 and 58. The cutter 56 is directed downwards and its free end describes, in a plane substantially level with the upper edge 44 of the partition 32, a circle an arc of which almost touches the internal wall 52 of the partition 32. On the other hand, the cutter 58, which is longer than the cutter 56, is directed towards the top 20 of the bell 18, and its free end 60 describes a circle an arc of which is above the upper edge 44 of the partition.

It will be understood that when the mixing arm is plunged into a liquid containing foodstuffs, the cutters 56 and 58, driven at high speed by the shaft 22 which emerges in the central region of the suction zone 34, create a suction effect, and at the same time cause a substantially complete comminution in this zone 34, as well as forcing down the mixture in the compression zone 36. This latter effect is favoured by the specific shape of the opening: the edge of the arch 49 being raised relative to the edge 44 of the partition 32 and the bevel 50.

It will be noted that the arrangement of the partition 32, almost the entire height of which is disposed below the peripheral edge 46–49 of the bell 18, helps to create a substantially horizontal circulation of liquid (arrows F in FIG. 1) thus decreasing the amount of recycling of the foodstuffs from the compression zone 36 to the suction zone 34. In order to stabilize the mixing arm when it rests on the bottom of a mixing container, the bell 18 comprises a prolongation 62 extending downwards from the peripheral edge 46 as far as the lower edge 48 of the partition 32.

In addition, because of the narrowness of the transfer opening 40 and the sweeping action of the end 60 of cutter 58 in this opening, there is not only a "venturi effect" which favours circulation of liquid between the suction and compression zones, but also the sweeping of this opening prevents any wedging of foodstuff which has not been disintegrated.

What is claimed is:

1. A mixing arm, especially for chopping foodstuffs immersed in a liquid and comprising;
   a tubular guard having an upper part adapted to be mounted on a drive unit and a lower part comprising a bell having a top wall;
   a rotatable shaft disposed longitudinally in the tubular guard and having an upper end adapted to be coupled to a rotating drive to be driven at high speed by the drive unit, and a lower end which passes through the top wall of the bell; and
   a mixing tool fixed to the lower end of the shaft for rotation therewith and extending transversely to the shaft;
   wherein the bell further comprises a partition extending downwards and transversely beneath the top wall of the bell and thus dividing the space beneath the bell into a suction zone in which the mixing tool is located and a compression zone situated between the external face of the partition and the corresponding wall portion of the bell; the upper region of the partition having an oblong transfer opening extending in width in the partition and making the suction zone communicate with the compression zone.

2. A mixing arm according to claim 1, wherein the mixing tool is fitted substantially opposite the opening so as to favour the movement of blended foodstuffs from the suction zone to the compression zone.

3. A mixing arm according to claim 1, wherein the partition extends outside the bell and comprises a lower edge situated at a distance from the peripheral edge of the bell.

4. A mixing arm according to claim 1, wherein the partition extends with an incurved surface and its lateral ends are attached to the descending wall of the bell at two diametrically opposite regions of this descending wall.

5. A mixing arm according to claim 4, wherein the partition has a generally rectangular contour, the upper edge of the partition being attached by its lateral ends substantially level with the peripheral edge of the descending wall of the bell, and the transfer opening being defined between the top of the bell and the upper edge of the partition.

6. A mixing arm according to claim 5, wherein, in the compression zone, the peripheral edge of the bell has the shape of an arch extending in a plane which forms an acute angle (a) with the upper edge of the partition, and the upper edge of the partition has an external bevel extending from the internal face to the external face of the partition.

7. A mixing arm according to claim 1 wherein the mixing tool comprises two opposing cutters, at least one of which is directed downwards and its free end describes, in a plane level with the upper edge of the partition, a circle an arc of which almost touches the internal wall of the partition.

8. A mixing arm according to claim 7, wherein the other cutter is directed towards the top of the bell and its free end describes a circle an arc of which is above the upper edge of the partition and thus sweeps the transfer opening so that it prevents any wedging of the disintegrated foodstuffs in the transfer opening.

9. A mixing arm according to claim 1, wherein the bell has a generally hemispherical shape with a flattened top, and is mounted eccentrically relative to the tubular guard in such a way that the shaft emerges in the central region of the suction zone.

* * * * *